UNITED STATES PATENT OFFICE 2,467,706

AQUEOUS DISPERSIONS OF PHENYL-BETA-NAPHTHYLAMINE

Bernard M. Sturgis, Pitman, N. J., assignor to E. I. du Pont de Nemours & Company, Wilmington, Del., a corporation of Delaware No Drawing. Application January 25, 1946, Serial No. 643,484

4 Claims. (Cl. 252—311)

This invention relates to the preparation of stable aqueous dispersions of phenyl-beta-naphthylamine, which are particularly useful as anti-oxidants in the elastomer field.

The secondary aromatic amines, such as phenyl-beta-naphthylamine, which are employed as anti-oxidants in the rubber and synthetic rubber industries, when employed with rubber latices or other aqueous dispersions of synthetic elastomers are preferably incorporated in such latices as aqueous dispersions. These aqueous dispersions of the amines are prepared with the aid of dispersing agents by the methods usually employed for dispersing solids in liquids. Ordinarily, the aromatic amine anti-oxidant dispersion is made up, as it is used, in concentrations of from 10% to 60%, and such dispersions are added to the latex in carefully measured amounts prior to the coagulation and drying of the elastomer. The aqueous dispersions of the secondary aromatic amines prepared by the methods heretofore employed are often not stable, and, on standing even for short periods of time, the amine settles out quite rapidly. Such sedimentation makes the handling, measuring and proper addition of the amine to the latex difficult. When such settling out of the dispersion occurs, it tends to plug pumps, valves and lines. It will also be obvious that, in such case, the amount of anti-oxidant actually added to the latex cannot be accurately determined, and therefore it is important, for smooth operation of the process, that stable dispersions of the anti-oxidants be used.

It is difficult to make stable aqueous dispersions of phenyl-beta-naphthylamine by the usual methods of dispersing solids in water, such as by grinding in a ball mill or even with the use of such efficient apparatus as the colloid mill. While most of the commercial wetting or dispersing agents give improved results when added to such suspensions, even the most efficient dispersing agents often fail to produce dispersions of phenyl-beta-naphthylamine which will not settle out after short periods of standing. The addition of larger amounts of the dispersing agent does not produce the desired stability.

It is therefore an object of this invention to provide a method of producing aqueous dispersions of phenyl-beta-naphthylamine with improved stability with regard to settling. A further object of the invention is to produce the phenyl-beta-naphthylamine in a form such that it can be readily dispersed in water by the usual methods, but which will give suspensions that are much more stable with regard to settling than are ordinarily obtained. A further object of the invention is to produce aqueous dispersions of phenyl-beta-naphthylamine in higher concentrations than has normally been possible and which will remain dispersed when diluted in water for a sufficient time to permit suitable processing of the rubber latices with which they are incorporated.

I have found that greatly improved aqueous dispersions of phenyl-beta-naphthylamine can be produced by adding to the amine a small amount of a straight chain primary aliphatic mercaptan containing from 8 to 14 carbon atoms, in which group the one containing 12 carbon atoms is preferred. The mercaptan is preferably added to the amine during the manufacture or flaking process, as more particularly illustrated in the following example, although it may be added during the preparation of the dispersion by adding it to the aqueous suspension and subjecting the mass to a milling or colloidal grinding operation. It appears that the mercaptan must be incorporated in such a manner that it has intimate contact with the dispersed particles of the phenyl-beta-naphthylamine, for, by merely adding the mercaptan to the already prepared dispersion without again subjecting the mass to conditions which would ordinarily disperse the solid in a liquid, the same results are not obtained as when the mercaptan is added to the amine during or prior to the dispersion operation. These mercaptans are effective as dispersing aids in amounts ranging from 0.1% to 10%, although practical limits of use are from 0.1% to 3%, based on the weight of the phenyl-beta-naphthylamine. Mixtures of mercaptans of this type appear to be as effective as the pure mercaptans by themselves.

This invention is applicable particularly in improving the dispersion stability of phenyl-beta-naphthylamine used as an anti-oxidant for rubber or other elastomers.

As pointed out above, the mercaptan may be added to the phenyl-beta-naphthylamine during the manufacture of the amine, or it can be intimately incorporated with the amine by a mixing or milling operation so that the amine is put in a form that can be readily dispersed in water by the user by the methods generally employed in preparing the amine dispersion. Alternatively, the mercaptan can be added to the water, amine and dispersing agent at the start of the dispersion process, or during the dispersion process. These mercaptans will function in any of the common dispersion processes wherein the phenyl-beta-naphthylamine is dispersed in water with a dispersing agent.

The straight chain primary aliphatic mercaptans in themselves do not appear to have properties of dispersing agents, and they function as a dispersing aid where the phenyl-beta-naphthylamine is dispersed in water by means of the usual dispersing agents. The preferred dispersing agent is the sodium salts of the reaction product of naphthalene, formaldehyde, and sulfuric acid, as more particularly disclosed in U. S. Patent 1,336,759. Other dispersing agents, such as the sodium salts of sulfated laurol or other alcohols, or mixtures of the same, purified sulfolignins, and the sodium salts of aliphatic sulfonates of petroleum hydrocarbons or similar dispersing agents, may be employed in place of the sodium salts of the naphthalene-formaldehyde-sulfuric acid condensation product.

The following example is given to illustrate the invention, in which parts used are by weight.

*Example*

One thousand (1000) parts of phenyl-beta-naphthylamine and 10 parts of n-dodecyl mercaptan were melting and flaked in a conventional drum type flaker, holding the melted material in the flaker pan at 140° to 150° C. and the surface of the drum at 90° C. The flaked material was then made into an aqueous dispersion by mixing 300 parts of it, 700 parts of distilled water and 6 parts of sodium salts of the naphthalene reaction product above referred to. This mixture was ground through a Charlotte colloid mill set at 0.0055 inch clearance for 20 minutes. In order to test its stability, 75 cc. of the resulting dispersion was placed in a 100 cc. graduated cylinder, brought up to 100 cc. with distilled water, shaken vigorously and allowed to stand for 20 minutes. No sediment could be seen at the bottom of the cylinder at the end of this time and no sediment remained behind when the liquid was carefully poured out. On the other hand, when no mercaptan was incorporated in the amine, the resulting dispersion gave 10.5 cc. of sediment in the test and this remained in the cylinder after pouring off the liquid.

Any of the other straight chain primary aliphatic mercaptans containing from 8 to 14 carbon atoms, such as the octyl, nonyl, decyl, tetradecyl mercaptans, may be substituted for the n-dodecyl mercaptan in the above example to give stable dispersions of the phenyl-beta-naphthylamine similar to that obtained with the n-dodecyl mercaptan.

When the number of carbon atoms is less than 8 or more than 14, the mercaptan has little or no favorable effect upon the stability of the amine dispersions. Thus, hexyl mercaptan, with 6 carbon atoms, gave 5 cc. of sediment both before and after decantation in the test, pentadecyl mercaptan (15 carbon atoms) gave 6 cc., and cetyl mercaptan (16 carbon atoms) gave 10 cc.

The use of the primary straight chain aliphatic mercaptans of from 8 to 14 carbon atoms enables the production of greatly improved aqueous dispersions of the phenyl-beta-naphthylamine. These dispersions, being more stable, can be used over much longer periods of time without settling out. By the addition of the straight chain mercaptans, of the type described as a dispersing aid, greatly improved dispersions are obtained, usually being much smaller in particle size, having lower viscosity for a given concentration, and having less tendency to foam. By the addition of these dispersing aids, much smaller amounts of the dispersing agent may be employed.

The dispersions formed according to the present invention may be added to any aqueous dispersion of oxidizable organic materials requiring stabilization by means of secondary aromatic amines.

I claim:

1. In the process for preparing aqueous dispersions of phenyl-beta-naphthylamine wherein the phenyl-beta-naphthylamine is dispersed in water by means of a water soluble dispersing agent, the steps which comprise incorporating in such aqueous dispersion, before the dispersion process is completed, from 0.1% to 10%, based on the weight of the amine, of a straight chain primary aliphatic mercaptan containing from 8 to 14 carbon atoms, and completing the dispersion process by a colloidal mixing operation.

2. An aqueous dispersion of phenyl-beta-naphthylamine which has been prepared by a colloidal mixing operation and which in addition to the water and phenyl-beta-naphthylamine consists of a water soluble dispersing agent and as a dispersion aid from 0.1% to 10%, based on the weight of the amine, of n-dodecyl mercaptan.

3. A phenyl-beta-naphthylamine composition which is readily dispersible in water by a colloidal mixing operation with the aid of a water soluble dispersing agent to give a dispersion which has improved stability with regard to settling, consisting of said amine having intimately incorporated therewith from 0.1% to 10%, based on the weight of the amine, of a straight chain primary aliphatic mercaptan containing from 8 to 14 carbon atoms.

4. A phenyl-beta-naphthylamine composition which is readily dispersible in water by a colloidal mixing operation with the aid of a water soluble dispersing agent to give a dispersion which has improved stability with regard to settling, consisting of said amine having intimately incorporated therewith from 0.1% to 10%, based on the weight of the amine, of n-dodecyl mercaptan.

BERNARD M. STURGIS.

REFERENCES CITED

The following references are of record in the file of this patent:

UNITED STATES PATENTS

| Number | Name | Date |
|---|---|---|
| 1,355,985 | Lilienfeld | Oct. 19, 1920 |
| 1,977,211 | Schur | Nov. 30, 1937 |
| 2,100,714 | Hiers | Nov. 30, 1937 |
| 2,227,517 | Starkweather | Jan. 7, 1941 |
| 2,234,204 | Starkweather | Mar. 11, 1941 |
| 2,281,613 | Wollthan | May 5, 1942 |